US005483731A

United States Patent [19]

Prendel et al.

[11] Patent Number: 5,483,731

[45] Date of Patent: Jan. 16, 1996

[54] UNIVERSAL HYDRAULIC TOOL

[75] Inventors: Troy A. Prendel, Jackson; Timothy D. Mulligan, Blissfield, both of Mich.

[73] Assignee: Aeroquip Corporation, Maumee, Ohio

[21] Appl. No.: 187,109

[22] Filed: Jan. 26, 1994

[51] Int. Cl.[6] .......... B23P 19/04

[52] U.S. Cl. .......... 29/237; 29/252; 29/282

[58] Field of Search .......... 29/237, 252, 283.5, 29/432, 525, 282; 285/382, 382.1–382.7, 39

[56] References Cited

U.S. PATENT DOCUMENTS

| | | |
|---|---|---|
| 1,018,035 | 2/1912 | DeLeeuw . |
| 2,623,080 | 12/1952 | Young . |
| 2,695,539 | 11/1954 | Grueninger . |
| 3,700,227 | 10/1972 | Sessody . |
| 3,827,727 | 8/1974 | Moebius . |
| 4,026,006 | 5/1977 | Moebius . |
| 4,189,817 | 2/1980 | Moebius . |
| 4,257,135 | 3/1981 | Moebius . |
| 4,482,174 | 11/1984 | Puri . |
| 5,297,325 | 3/1994 | Thelen . |
| 5,305,510 | 4/1994 | Croft et al. .......... 29/237 |

FOREIGN PATENT DOCUMENTS

| | | |
|---|---|---|
| 3039818 | 3/1982 | Germany . |

OTHER PUBLICATIONS

Deutsch Permalite Series Brochure, Performance and reliability of metal–to–metal, mechanical seals., Deutsch Metal Components, dated Aug. 1992.

*Primary Examiner*—Robert C. Watson
*Attorney, Agent, or Firm*—Emch, Schaffer, Schaub & Porcello

[57] ABSTRACT

A universal hydraulic tool for compressing a connector fitting to tube portions to be joined is disclosed. The tool includes a base member and a tool member which define aligned receiving chambers. The base member defines a first jaw set and a slide member defines a second jaw set. The reception chambers have a width adjacent the jaw sets slightly larger than the connector fitting end. The base member mounts a cylinder having a piston operatively connected to the slide member. Relative movement between the base member and the slide member compress the connector fitting in either the forward direction or the reverse direction to form the desired tube joint without using a different hydraulic tool.

2 Claims, 4 Drawing Sheets

UNIVERSAL HYDRAULIC TOOL

BACKGROUND OF THE INVENTION

The present invention is directed to a hydraulic tool for compressing or swaging together connectors on tubes. More specifically, the present invention is directed to a universal hydraulic tool which may be used in either a forward or reverse direction.

The present universal hydraulic tool is particularly useful for joining tubular components to form a permanent tube joint of a type where a constrictor ring with a tapered bore is axially forced over a collar encircling the end of the tube to cause local annular compression of the collar and the encircled tube. Tube joints of this type are shown in a number of prior art patents, including U.S. Pat. Nos. 3,827,727; 4,026,006 and 4,482,174. Tube joints of this type require significant amounts of axial force to cause the constrictor ring to be moved axially over the collar member while radially compressing and deforming it and the tube encircled by the collar.

U.S. Pat. No. 4,189,817 discloses a hydraulic assembly tool for tube fittings which may be used for assembling the components of the tube joints described in the above patents. An improved hydraulic assembly tool is disclosed in U.S. patent application Ser. No. 08/029,828, filed Mar. 11, 1993 now U.S. Pat. No. 5,297,325. The disclosure in that application is incorporated herein by reference.

SUMMARY OF THE INVENTION

The present invention is directed to an improved universal hydraulic tool specifically designed to assemble tube joints of the type described above in both the forward and reversed directions. This is particularly meaningful in assembling tube joints in close quarters, such as adjacent bulk heads in airplanes. The universal hydraulic tool, according to the present invention, includes a base member and a slide member mounted for relative movement on the base member. The base member includes piston means operatively connected to the slide member. The base member and the slide member define aligned first and second tube reception chambers for receiving tube portions and a connector fitting. The base member defines a first jaw set and the sliding member defines a second jaw set. The jaw sets are in opposed relationship to one another and are mounted on the centerline of the aligned reception chambers. The jaw sets are positioned perpendicular to the centerline. The first and second reception chambers have a width adjacent the jaw sets slightly larger than the width of the connector fitting end. The base member has a generally planar front surface adjacent the first jaw set and perpendicular to the centerline.

DESCRIPTION OF THE PREFERRED EMBODIMENT

Figure 1:
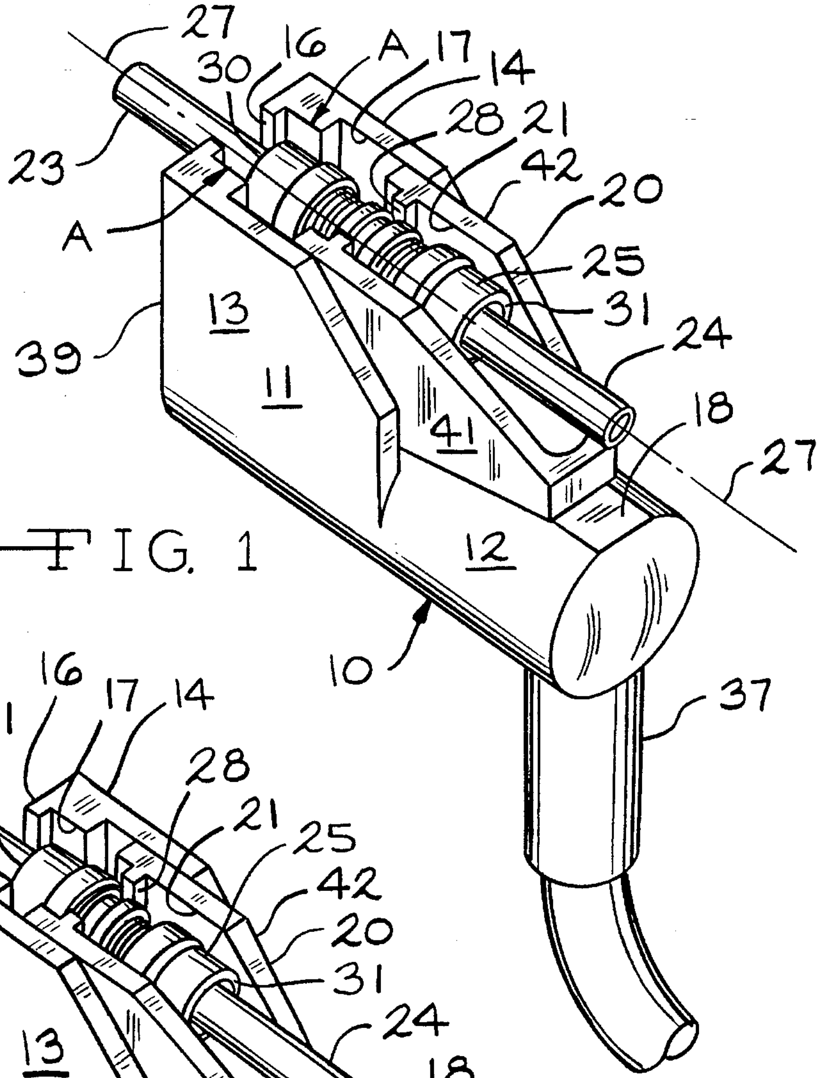
FIG. 1 is a perspective view of a universal hydraulic tool, according to the present invention, prior to reverse actuation of the tool.
Figure 2:
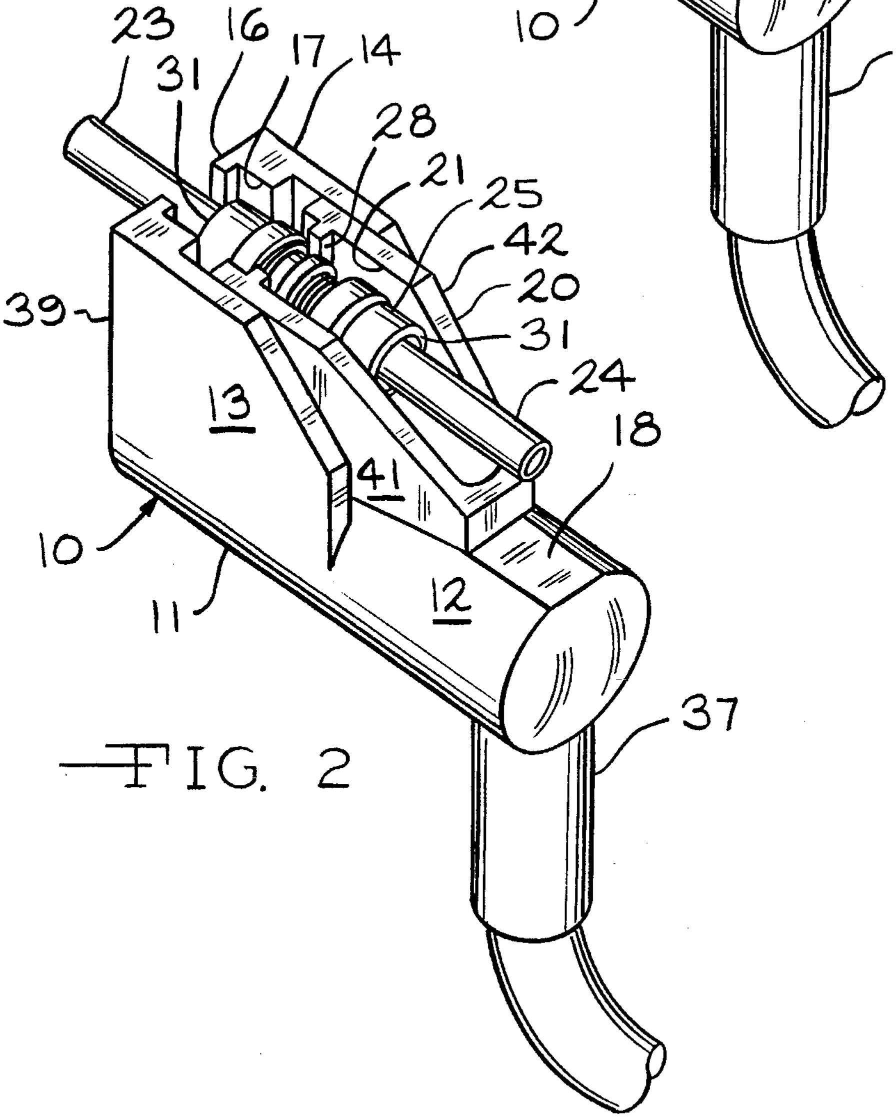
FIG. 2 is perspective view, similar to FIG. 1, and showing the position of the components after the reverse movement has been completed.

A universal hydraulic tool, according to the present invention, is generally indicated by the reference number 10 in FIG. 1. The tool 10 includes a base member 11 having a generally cylindrical body 12 and integral sidewalls 13 and 14 extending upwardly from the body 12. The base member 11 defines a first jaw set 16 and a longitudinally extending reception chamber 17. The base member 11 defines an upper flat slide surface 18. A slide member 20 is mounted for movement along the surface 18. The sliding member 20 defines a reception chamber 21 which is aligned with the reception chamber 17 of the base member 11. Tube portions 23 and 24 are received in a connector fitting 25 and are positioned within the aligned reception chambers 17 and 21 along a longitudinal centerline 27.

The slide member 20 defines a second jaw set 28 in opposed relationship to the first jaw set 16.

Figure 3:
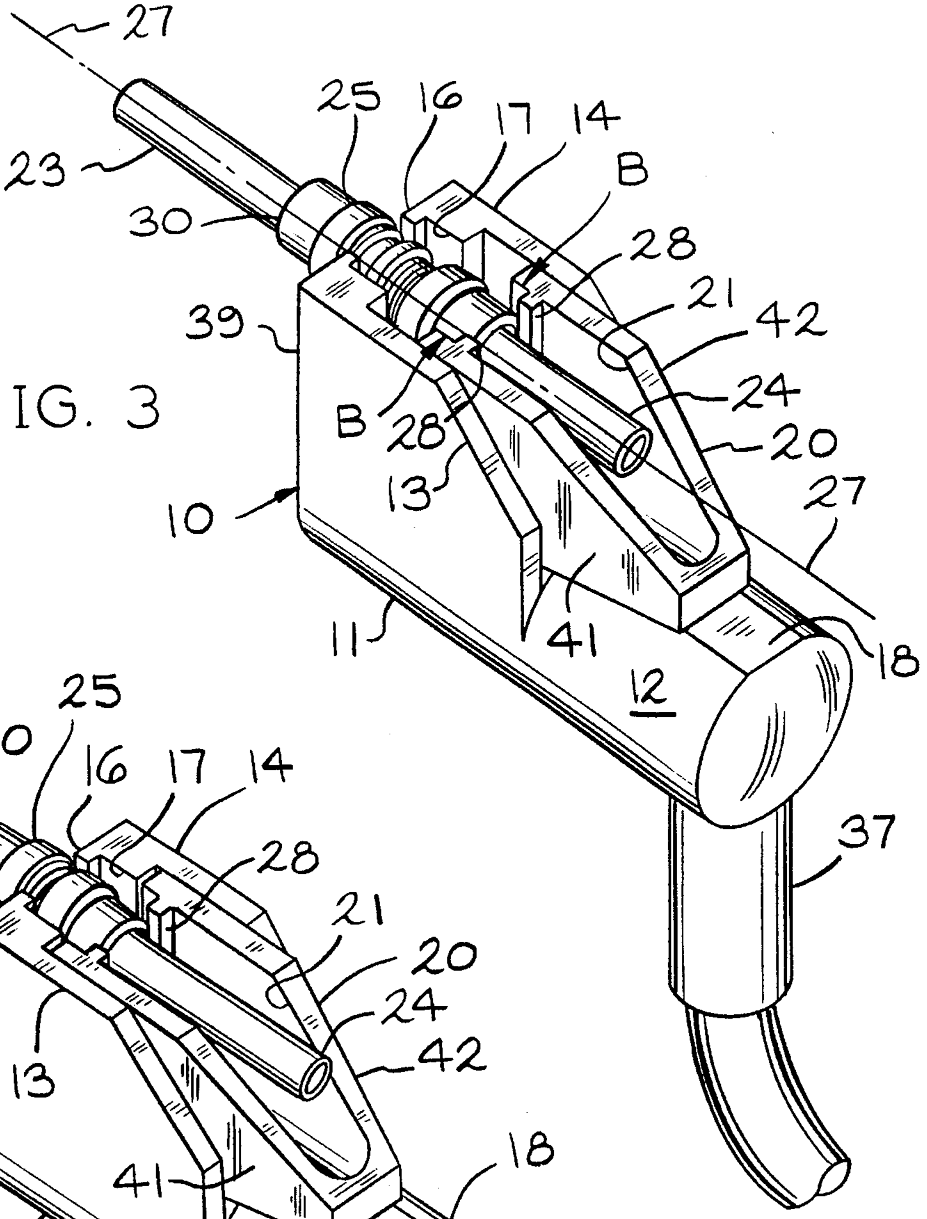
FIG. 3 is a perspective view, similar to FIG. 1, after repositioning of the universal hydraulic tool and prior to forward actuation of the tool.
Figure 4:
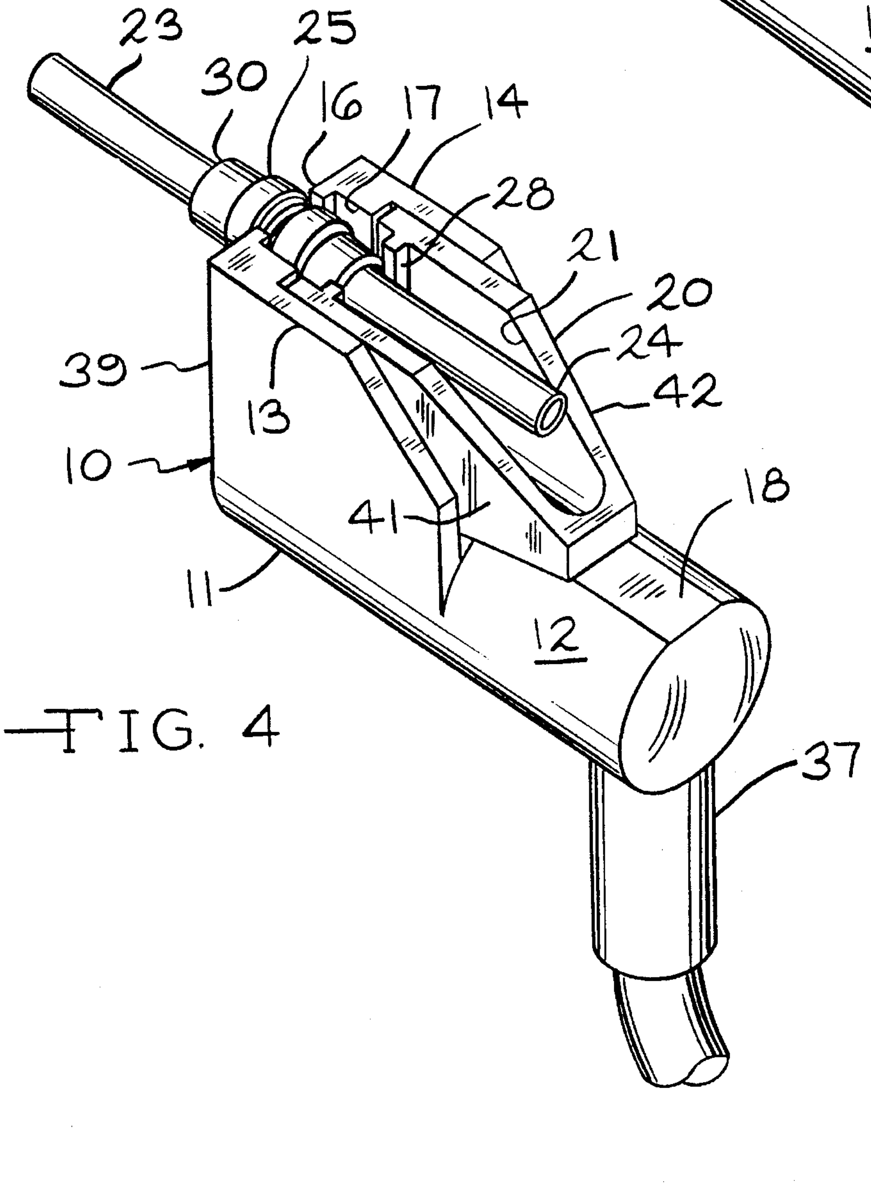
FIG. 4 is a perspective view, similar to FIG. 1, showing the components after forward actuation of the tool.
Figure 5:
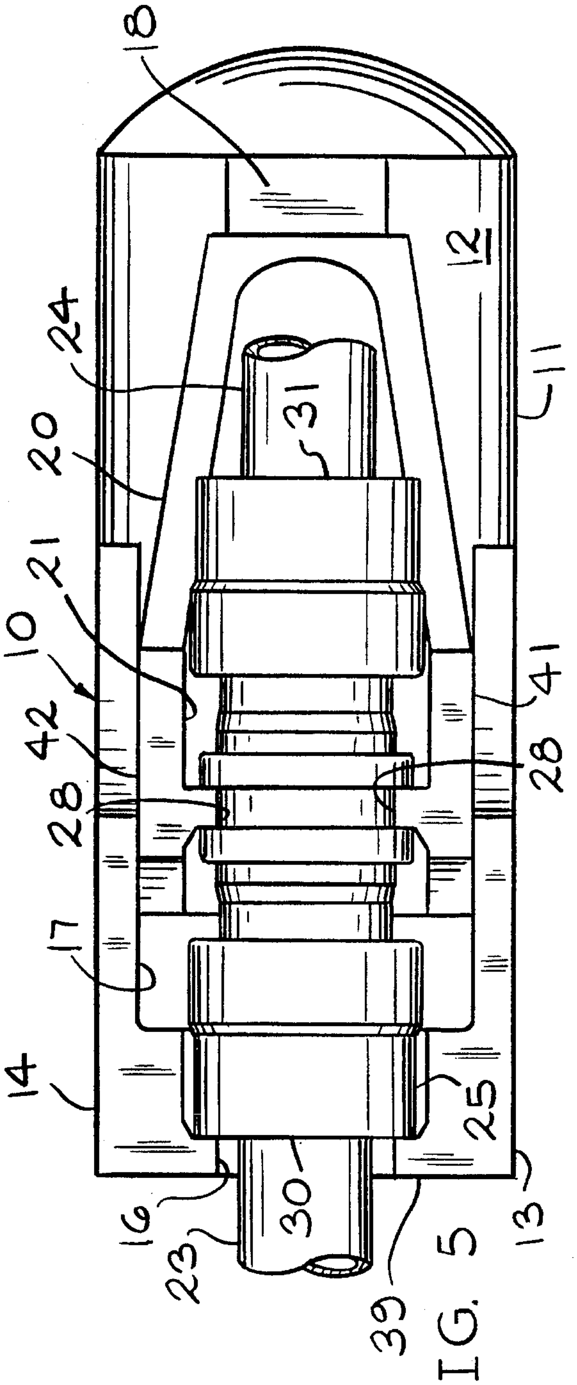
FIG. 5 is a top plan view of the universal hydraulic tool, as shown in FIG. 1 and shown on an enlarged scale.

Referring to FIGS. 1 and 3, the base member 11 defines a width A adjacent the jaw set 16 and the slide member 20 defines a width B adjacent the second jaw set 28. The connector fitting 25 in the present embodiment includes ends 30 and 31 having a predetermined width or diameter. The first and second reception chambers 17 and 21 have widths adjacent the first and second jaw sets 16 and 28 slightly larger than the width of the connector fitting ends 30 and 31. The widths "A" and "B" are slightly larger than the ends 30 and 31. The widths "A" and "B" are equal to one another in the present embodiment.

In the present embodiment the first jaw set 16 and the second jaw set 28 have predetermined thickness dimensions, measured along the longitudinal centerline 27, generally equal to one another.

Figure 6:
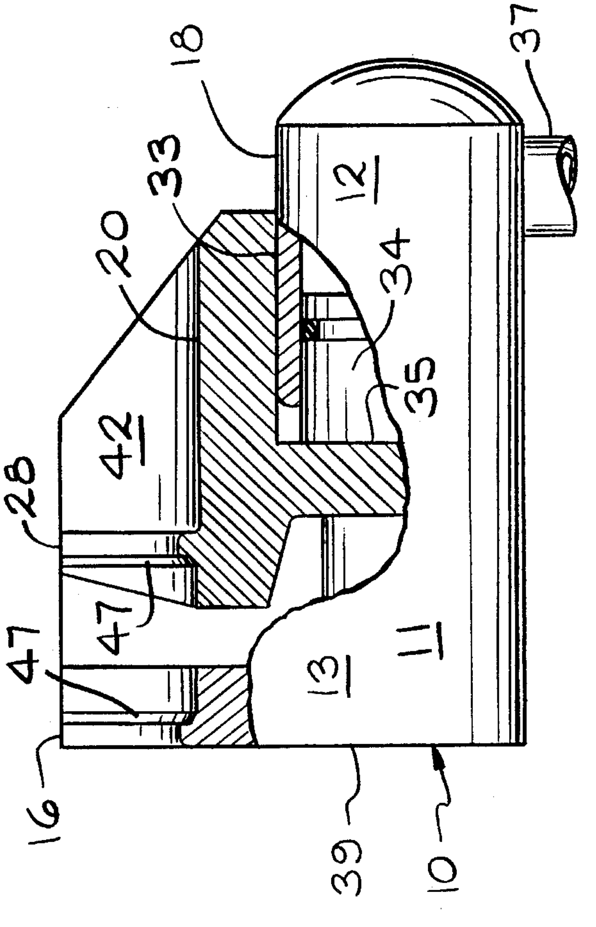
FIG. 6 is a fragmentary sectional view of the universal hydraulic tool shown in FIG. 5 and shown on a reduced scale.

Referring to FIG. 6, the body 12 of the base member 11 defines a cylinder 33. A piston 34 is mounted in the cylinder 33 and is connected by an arm 35 to the slide member 20. High pressure hydraulic fluid is introduced through a fluid conduit 37 into the cylinder 33. The high pressure fluid drives the slide member 20 and generates forces in excess of 5000 psi to compress or swage the connector fitting 25 to the tube portions 23 and 24. A spring (not shown) is utilized to return the piston 34 to its home position. Referring to FIGS. 1 and 6, the base member 11 has a generally planar front surface 39 closely adjacent the first jaw set 16. The front surface 39 is perpendicular to the longitudinal centerline 27. The design of the front surface 39 and its closeness to the first jaw set 16 allows the universal hydraulic tool 10 to be placed close to a partition or bulk head in the field, wherein a repair to tubing may be made in close quarters.

Figure 7:
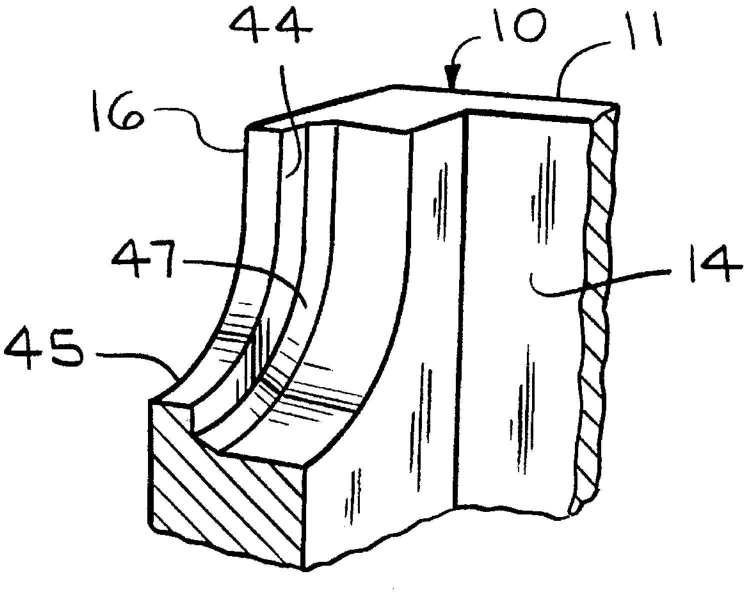
FIG. 7 is a fragmentary view of the first jaw set and showing in particular the centering ramp.
Figure 8:
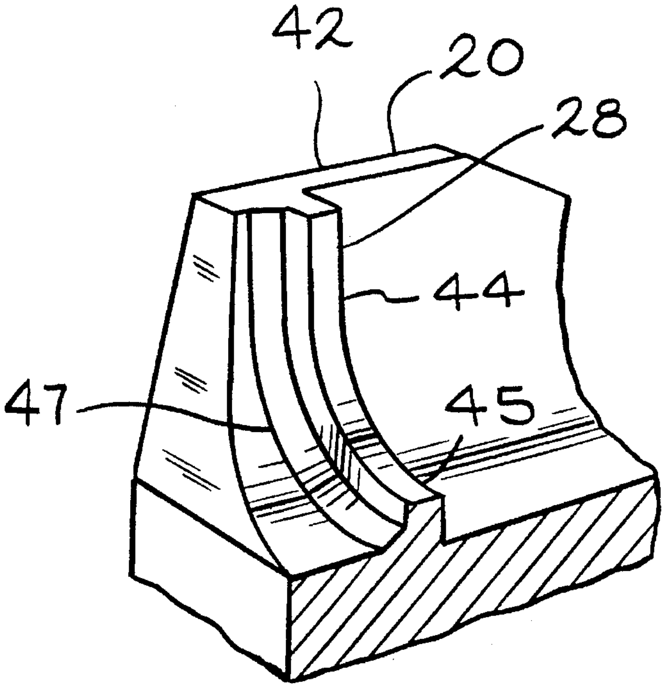
FIG. 8 is a view similar to FIG. 7 showing the second jaw set and its centering ramp.

The slide member 20 includes sidewalls 41 and 42 which are movable within the sidewalls 13 and 14 of the base member 11 during relative movement of the base member 11 and the slide member 20. Referring to FIGS. 1 and 7, the first jaw set 16 defined by the base member 11 is generally "U"

shaped. Similarly, referring to FIG. 8, the second jaw set 28 defined by the slide member 20 is also generally "U" shaped. Both the first and second jaw sets 16, 20 including opposed vertical jaw portions 44 and a curved lower jaw portion 45 which is integral to and extends between the opposed vertical jaw portions 44. If desired, as shown in FIGS. 6, 7 and 8, a centering ramp 47 is positioned adjacent the lower jaw portions 45 and upwardly along at least a part of the opposed vertical jaw portions 44. The centering ramps 47 urge a misaligned connector fitting, for example, the connector fitting 25, to a correct centered position along the longitudinal centerline 27 during relative movement of the base member 11 and the slide member 20.

Referring to FIGS. 1–4, a typical operation of the universal hydraulic tool 10 is illustrated. A connector fitting 25, in the present embodiment a union-type connector fitting, has received a pair of tube portions 23 and 24 which are to be joined in a tight joint. These members are then received by the aligned reception chambers 17 and 21 defined by the base member 11 and the slide member 20, respectively. The universal hydraulic tool 10 is then activated. The base member 11 and the slide member 20 move in a reverse direction to the position shown in FIG. 2. The relative movement of the first jaw set 16 and the second jaw set 28 compress and swage the left hand portion of the connector fitting 25 (as shown in FIG. 1).

At this time, without substituting tools, the universal hydraulic tool 10 is moved to the position shown in FIG. 3. The universal hydraulic tool 10 is then activated and relative movement of the first jaw set 16 and the second jaw set 28 continues in the forward direction. This compresses or swages the right hand side of the connector fitting 25 (as viewed in FIG. 3) to achieve the final tube joint.

Many revisions may be made to the above described embodiment without departing from the scope of the invention or from the following claims.

We claim:

1. A universal hydraulic tool comprising a base member and a slide member mounted for relative movement on said base member, said base member including piston means operatively connected to said slide member, said base member and said sliding member defining aligned first and second reception chambers for receiving tube portions and a connector fitting, said connector fitting having an end, said aligned reception chambers defining a longitudinal centerline, said base member defining a first jaw set, said sliding member defining a second jaw set, said jaw sets being in opposed relationship to one another and positioned perpendicular to said centerline, said jaw sets having predetermined thickness dimensions along said centerline substantially equal to one another, said first and second reception chambers having a width adjacent said jaw sets slightly larger than the width of said connector fitting end, said base member having a generally planar front surface adjacent said first jaw set and perpendicular to said centerline.

2. A universal hydraulic tool according to claim 1, wherein each of said jaw sets are generally "U" shaped, said jaw sets including opposed vertical jaw portions and a curved lower jaw portion between said opposed vertical jaw portions, and a centering ramp positioned adjacent said lower jaw portions and at least a part of said opposed vertical jaw portions, wherein a misaligned connector fitting is engaged by said ramp and is urged to a centered position during relative movement of said base member and said slide member.

* * * * *